US012786099B2

(12) United States Patent
Wang et al.

(10) Patent No.: US 12,786,099 B2
(45) Date of Patent: Nov. 3, 2026

(54) BGP ROUTE SENDING METHOD AND DEVICE, STORAGE MEDIUM, AND ELECTRONIC DEVICE

(71) Applicant: ZTE Corporation, Shenzhen (CN)

(72) Inventors: Yubao Wang, Shenzhen (CN); Chunning Dai, Shenzhen (CN); Zheng Zhou, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 241 days.

(21) Appl. No.: 18/847,387

(22) PCT Filed: Dec. 14, 2022

(86) PCT No.: PCT/CN2022/139069
§ 371 (c)(1),
(2) Date: Sep. 16, 2024

(87) PCT Pub. No.: WO2023/173853
PCT Pub. Date: Sep. 21, 2023

(65) Prior Publication Data

US 2025/0211516 A1 Jun. 26, 2025

(30) Foreign Application Priority Data

Mar. 16, 2022 (CN) ......................... 202210259238.0

(51) Int. Cl.
*H04W 4/00* (2018.01)
*H04L 45/02* (2022.01)
*H04L 45/50* (2022.01)

(52) U.S. Cl.
CPC ............. *H04L 45/04* (2013.01); *H04L 45/50* (2013.01)

(58) Field of Classification Search
CPC ......... H04L 45/04; H04L 45/50; H04L 45/00; H04L 45/033
See application file for complete search history.

(56) References Cited

U.S. PATENT DOCUMENTS 7,675,912 B1 * 3/2010 Ward .................... H04L 45/026 370/392
9,178,810 B1 11/2015 Singh et al.
(Continued)

FOREIGN PATENT DOCUMENTS

CN 106375221 A 2/2017
CN 108632146 A 10/2018
(Continued)

OTHER PUBLICATIONS

Decrane, B et al., "BGP Next-hop dependent capabilities draft-ietf-idr-next-hop-capability-03", Jun. 26, 2018.
(Continued)

*Primary Examiner* — Omoniyi Obayanju
(74) *Attorney, Agent, or Firm* — CANTOR COLBURN LLP

(57) ABSTRACT

A BGP route sending method includes: receiving, by a second node, a first BGP route advertised by a third node, wherein the first BGP route carries a first attribute and a second attribute; performing, by the second node, first processing on the second attribute to obtain a second BGP route, wherein the second node is unable to recognize the first attribute, but has a capability of recognizing the second attribute; and in response to the second node being unable to recognize the first attribute, adding, by the second node, first indication information to the second BGP route while retaining the first attribute in the second BGP route, and sending, by the second node, the second BGP route to the first node, wherein the first indication information is indication infor-
(Continued)

mation used for indicating whether the first processing affects the first attribute.

20 Claims, 6 Drawing Sheets

(56) References Cited

U.S. PATENT DOCUMENTS

| | | | | |
|---|---|---|---|---|
| 9,369,380 | B1 | 6/2016 | Singh et al. | |
| 2016/0294987 | A1 | 10/2016 | Tian et al. | |
| 2017/0366461 | A1 | 12/2017 | Wu | |
| 2022/0029911 | A1 | 1/2022 | Zhang et al. | |
| 2023/0336458 | A1* | 10/2023 | Ge | H04L 45/28 |

FOREIGN PATENT DOCUMENTS

| | | | |
|---|---|---|---|
| CN | 112087386 | A | 12/2020 |
| CN | 113507414 | A | 10/2021 |
| WO | 2010016642 | A2 | 2/2010 |
| WO | 2021135624 | A1 | 7/2021 |

OTHER PUBLICATIONS

Decraene Orange, "BGP Next-Hop dependence capabilities", Dec. 8, 2021, pp. 1-13, XP015149292, Internet.
European Search Report for corresponding application EP22931861; Mail date May 15, 2025.
Chinese Office Action/Search Report for corresponding application 202210259238.0, dated Sep. 25, 2025.
Japanese Office Action for corresponding application 2024-546302, Mail date Oct. 3, 2025.

* cited by examiner

BGP ROUTE SENDING METHOD AND DEVICE, STORAGE MEDIUM, AND ELECTRONIC DEVICE

CROSS-REFERENCE TO RELATED APPLICATION

This disclosure is a national stage filing under 35 U.S.C. § 371 of international application number PCT/CN2022/139069, filed on Dec. 14, 2022, which claims priority to Chinese Patent Application No. 202210259238.0, filed with the China National Intellectual Property Administration on Mar. 16, 2022 and entitled "BGP route sending method and Device, Storage Medium, and Electronic Device", which is incorporated herein by reference in its entirety.

TECHNICAL FIELD

The present disclosure relates to the field of communications, and in particular, to a Border Gateway Protocol (BGP) route sending method and device, a storage medium, and an electronic device.

BACKGROUND

In a Multi-Protocol Label Switching (MPLS) network, during a process of per-flow load balancing, a Label Switching Router (LSR) device needs to extract Internet Protocol (IP) content carried in an MPLS packet to calculate a HASH KEY. However, there are issues with ineffective extraction and low extraction performance during the extraction process.

In RFC6790, the concept of Entropy Labels is proposed to address the issues.

An Entropy Label is a label generated by an ingress LSR based on load balancing information, and is not used for forwarding or signaling purposes, but only for improving the load balancing process.

The Entropy Label is generated and encapsulated into an MPLS label stack at the Ingress LSR. When a packet at the Ingress LSR has not yet been encapsulated with an MPLS label, the IP content of the packet can easily be obtained. When the Ingress LSR recognizes that a downstream LSR has enabled Entropy Label capability, the Ingress LSR calculates the Entropy Label based on the IP content of the packet and pushes the Entropy Label into the MPLS label stack to pass the Entropy Label on to the downstream LSR. A transit LSR does not need to extract the inner IP data carried in the MPLS packet, and can directly utilize the Entropy Label in the MPLS label stack to calculate the HASH KEY, thus achieving per-flow load balancing.

The above process is shown in FIG. 3. The egress LSR (P0) distributes labels to upstream nodes and advertises the Entropy Label capability. The ingress LSR (P4) calculates two different Entropy Labels for two IP flows entering the MPLS forwarding domain, and pushes the calculated Entropy Labels into the label stack. The transit LSR (P3) updates the Entropy Labels to achieve per-flow load balancing.

To support the above scenario, an Entropy Label Capability (ELC) Attribute (ELCA) is added in RFC6790 to various label signaling protocols. For example, in the BGP protocol, an optional transitive attribute with an attribute type value 28, known as an ELC attribute (a BGP Entropy Label Capability Attribute), was introduced.

However, in RFC7447, this attribute was deprecated. The reason for deprecation was that if a device does not support handling Entropy Labels, when the device sends a label to an upstream LSR and updates the next hop, the device should remove the Entropy Label capability; otherwise, it may lead to traffic black hole. Unfortunately, the ELC attribute is an optional transitive attribute, and according to the processing rules of RFC4271, if the attribute is not recognized, the attribute will be transmitted transparently.

The process of the generation of the above-mentioned traffic black hole is described with reference to FIG. 4.

As shown in FIG. 4, AS3 is a 6PE network, AS2 is a pure IPv6 network, and AS1 is a 6PE network. There are devices in the hybrid network that do not support the Entropy Label Capability and do not recognize the ELC attribute. Only PE0 and PE5 support ELC. The route and the label sent by the egress LSR PE0 carry the ELC attribute. However, since PE1 to PE4 do not recognize the ELC attribute, the attribute will be transparently transmitted. PE5 supports ELC, and upon receiving the attribute, PE5 will insert an entropy label when the data flow of IP1 enters the 6PE network. However, when the traffic reaches PE4, PE4 cannot remove the entropy label, so the traffic will be discarded on PE3 after reaching PE3.

However, not all nodes that do not recognize the ELCA (Entropy Label Capability Attribute) will lead to traffic black holes. For example, as shown in FIG. 5, although there is a node (i.e., ABR2 node) that does not recognize the ELCA, a traffic black hole will not be generated.

After RFC7447 deprecated the ELC attribute, a substitute solution has not been provided in the related technologies. When a BGP route published by an egress node is relayed by an intermediate node, and the intermediate node does not recognize a certain ELC attribute in the BGP route, there is a lack of mechanisms in the related technologies for the ingress node to determine whether the intermediate node can cause a traffic black hole through the ELC attribute.

Aiming at the problem in the related art that a receiving end is unable to recognize, in a transit sending process of a BGP route via an intermediate node, whether the intermediate node will prevent some BGP attributes in the BGP route from being applied to a forwarding plane, no solution has been proposed in the related art.

SUMMARY

Embodiments of the present disclosure provide a BGP route sending method and device, a storage medium, and an electronic device, which may at least solve the problem in the related art that a receiving end is unable to recognize, in a transit sending process of a BGP route via an intermediate node, whether the intermediate node will prevent some BGP attributes in the BGP route from being applied to a forwarding plane.

According to an aspect of the embodiments of the present disclosure, provided is a BGP route sending method, including: receiving, by a second node, a first BGP route advertised by a third node, wherein the first BGP route carries a first attribute and a second attribute; performing, by the second node, first processing on the second attribute to obtain a second BGP route, wherein the second node is located between the third node and a first node, the second node is unable to recognize the first attribute, but has a capability of recognizing the second attribute, and the first processing is modifying the second attribute by the second node; and in response to the second node being unable to recognize the first attribute, adding, by the second node, first indication information to the second BGP route while retaining the first attribute in the second BGP route, and sending, by the second node, the second BGP route to the first node, wherein the first indication information is indication information used for indicating whether the first processing affects the first attribute.

According to another aspect of the embodiments of the present disclosure, provided is a BGP route sending device, which is applied to a second node and includes: a receiving module, configured to receive a first BGP route advertised by a third node, wherein the first BGP route carries a first attribute and a second attribute; a processing module, configured to perform first processing on the second attribute to obtain a second BGP route, wherein the second node is located between the third node and a first node, the second node is unable to recognize the first attribute, but has a capability of recognizing the second attribute, and the first processing is modifying the second attribute by the second node; and a sending module, configured to, in response to the second node being unable to recognize the first attribute, add first indication information to the second BGP route while retaining the first attribute in the second BGP route, and send the second BGP route to the first node, wherein the first indication information is indication information used for indicating whether the first processing affects the first attribute.

According to still another aspect of the embodiments of the present disclosure, provided is a computer-readable storage medium, the computer-readable storage medium stores a computer program, and the computer program, when running on a processor, causes the processor to execute the described BGP route sending method.

According to yet another aspect of the embodiments of the present disclosure, provided is an electronic device, including a memory and a processor, wherein the memory stores a computer program, and the processor is configured to run the computer program to execute the described BGP route sending method.

By means of the embodiments of the present disclosure, a second node receives a first BGP route advertised by a third node, wherein the first BGP route carries a first attribute and a second attribute; the second node performs first processing on the second attribute to obtain a second BGP route, wherein the second node is located between the third node and a first node, the second node is unable to recognize the first attribute, but has a capability of recognizing the second attribute, and the first processing is modifying the second attribute by the second node; and in response to the second node being unable to recognize the first attribute, the second node adds first indication information to the second BGP route while retaining the first attribute in the second BGP route, and sends the second BGP route to the first node, wherein the first indication information is indication information used for indicating whether the first processing affects the first attribute. The technical solution provided in the embodiments of the present disclosure solves the technical problem in the related art that a receiving end is unable to recognize, in a transit sending process of a BGP route via an intermediate node, whether the intermediate node will prevent some BGP attributes in the BGP route from being applied to a forwarding plane, and particularly solves the problem of traffic black holes caused by the intermediate node through the affected BGP attributes. The technical solution provided in the embodiments of the present disclosure achieves the technical effects of shortening the range of network nodes needing to be upgraded and reducing the network maintenance cost.

BRIEF DESCRIPTION OF THE DRAWINGS

The drawings described herein are intended to provide further understanding of the present disclosure, and form a part of the present disclosure. The exemplary embodiments of the present disclosure and the description thereof are used to explain the present disclosure, and do not form improper limits to the present disclosure. In the drawings.

DETAILED DESCRIPTION

In order to make those having ordinary skill in the art better understand the solutions of the present disclosure, the following clearly and completely describes the technical solutions in the embodiments of the present disclosure with reference to the accompanying drawings in the embodiments of the present disclosure. Apparently, the described embodiments are merely a part rather than all of the embodiments of the present disclosure. All other embodiments obtained by those having ordinary skill in the art based on the embodiments of the present disclosure without creative efforts shall belong to the scope of protection of the present disclosure.

It should be noted that, terms such as “first” and “second” in the specification, claims, and accompanying drawings of the present disclosure are used to distinguish similar objects, but are not necessarily used to describe a specific sequence or order. It should be understood that the data so used may be interchanged where appropriate so that the embodiments of the present disclosure described herein may be implemented in sequences other than those illustrated or described herein. In addition, the terms "include" and "have", and any variations thereof, are intended to cover a non-exclusive inclusion, for example, a process, method, system, product, or apparatus that includes a series of operations or units is not necessarily limited to those operations or units that are expressly listed, but may include other operations or units that are not expressly listed or inherent to such process, method, product, or apparatus.

It should be noted that, in the following embodiments of the present disclosure, some of the terms mentioned and their paraphrases include the following:

ELC (Entropy Label Capability);
ELCA (Entropy Label Capability Attribute);
FL (Flow Label);
FLC (Flow Label Capability);
CW (Control Word);
CWC (Control Word Capability);
EL (Entropy Label);
ELI (Entropy Label Indicator);
EVI (EVPN Instance, particularly L2 EVPN instance);
BD (Broadcast Domain);
BUM (Broadcast, Unknown Unicast and Multicast);
EC (Extended Community);
Partial flag bit, i.e. Partial bit in Attr. Flags defined in RFC4271, page 16;
Transitive flag bit, i.e. Transitive bit in Attr. Flags defined in RFC4271, page 16.

Figure 1:
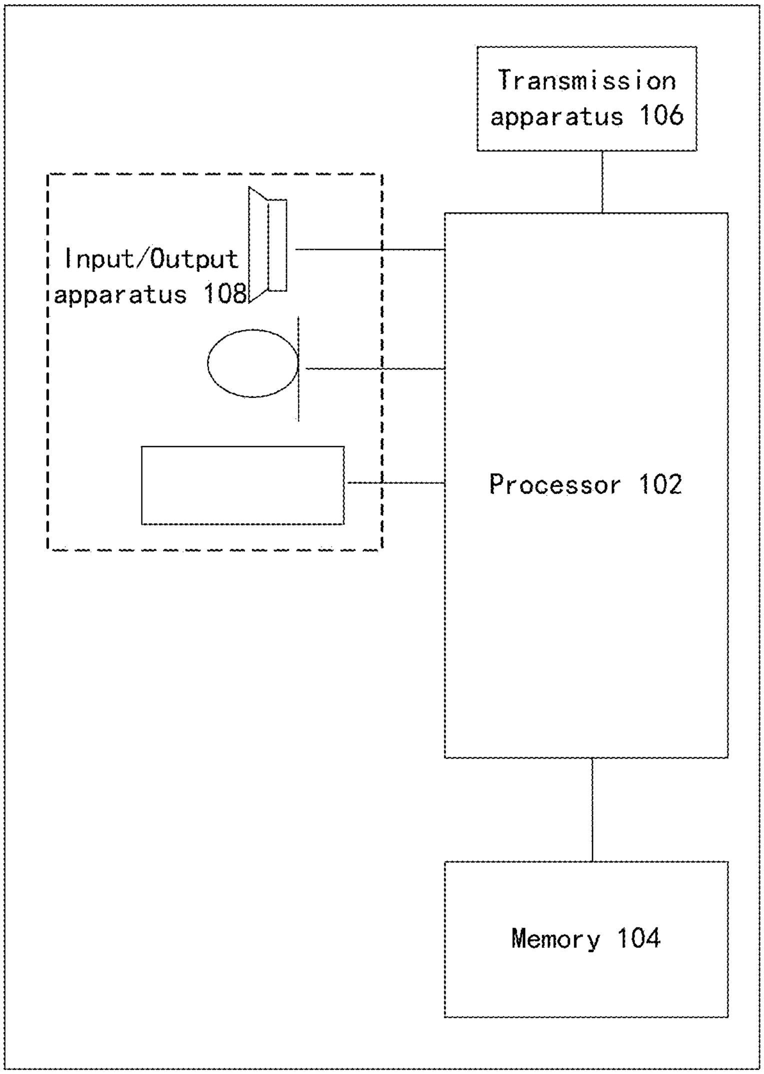
FIG. 1 is a block diagram of the hardware structure of an exemplary computer terminal for a BGP route sending method according to some embodiments of the present disclosure.

The method embodiments provided in the embodiments of the present disclosure may be executed in a computer terminal or a similar computing device. Taking the running on a computer terminal as an example, FIG. 1 is a block diagram of the hardware structure of an exemplary computer terminal for a BGP route sending method according to some embodiments of the present disclosure. As shown in FIG. 1, the computer terminal may include one or more (only one is shown in FIG. 1) processors 102 (each of the one or more processors 102 may include, but is not limited to, a Microprocessor Unit (MPU) or a Programmable logic device (PLD)) and a memory 104 for storing data. In an exemplary embodiment, the computer terminal may further include a transmission apparatus 106 for communication function and an input/output apparatus 108. Those having ordinary skill in the art may understand that the structure shown in FIG. 1 is merely exemplary, which does not limit the structure of the foregoing computer terminal. For example, the computer terminal may further include more or fewer components than shown in FIG. 1, or have a different configuration from the equivalent functions shown in FIG. 1 or more than the functions shown in FIG. 1.

The memory 104 may be configured to store a computer program, for example, a software program and a module of application software, such as a computer program corresponding to the BGP route sending method in the embodiments of the present disclosure. The one or more processors 102 run the computer program stored in the memory 104, so as to execute various function applications and data processing, that is, to implement the foregoing method. The memory 104 may include a high-speed random access memory, and may also include a non-volatile memory, such as one or more magnetic storage devices, flash memory, or other non-volatile solid-state memory. In some examples, the memory 104 may further include a memory remotely located with respect to the one or more processors 102, which may be connected to the computer terminal over a network. Examples of such network include, but are not limited to, the internet, an intranet, a local area network, a mobile communication network, and combinations thereof.

The transmission apparatus 106 is configured to receive or transmit data via a network. Specific examples of the described network may include a wireless network provided by a communication provider of the computer terminal. In an example, the transmission apparatus 106 may include a Network Interface Controller (NIC) that may be coupled to other network devices via a base station to communicate with the Internet. In an example, the transmission apparatus 106 may be a Radio Frequency (RF) module for communicating wirelessly with the Internet.

Figure 2:
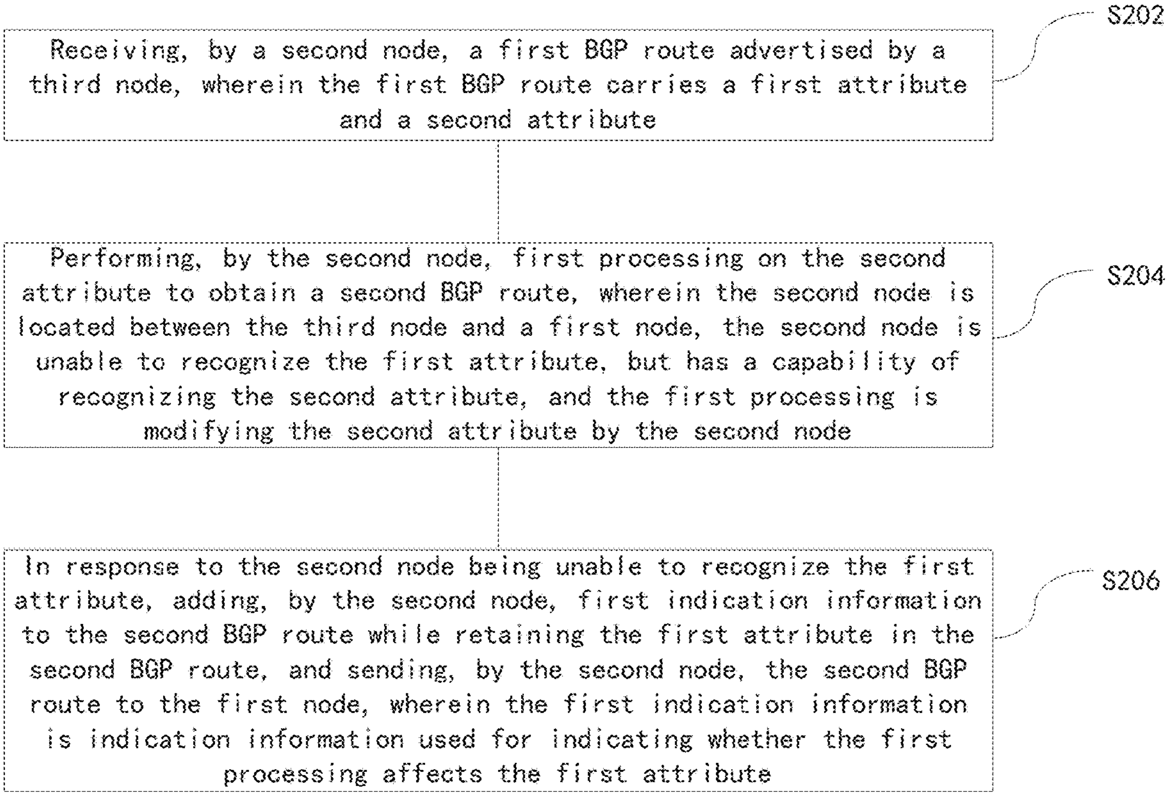
FIG. 2 is a flowchart of a BGP route sending method according to some embodiments of the present disclosure.
Figure 3:
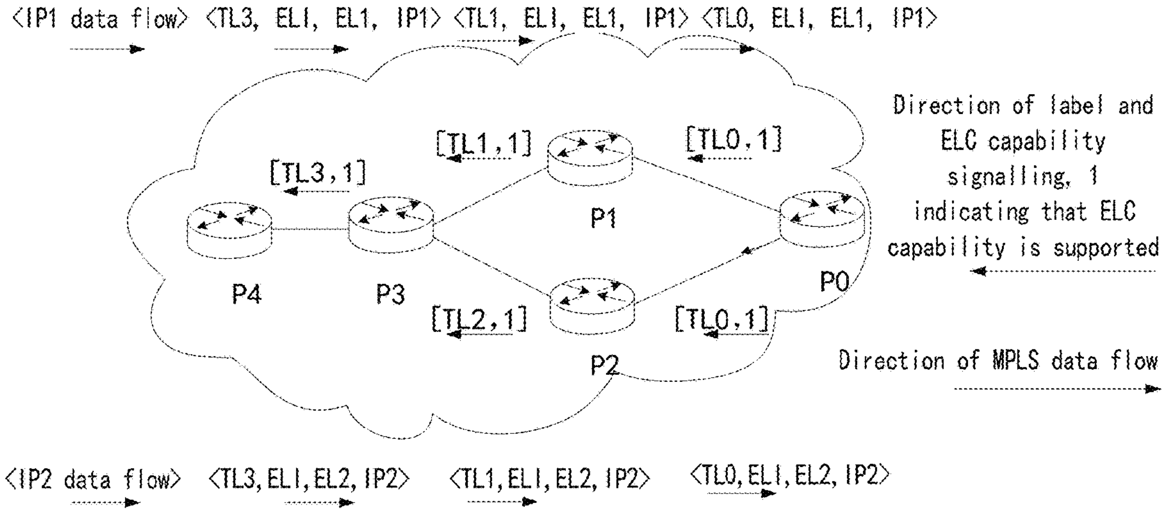
FIG. 3 is a schematic flowchart of an exemplary BGP route sending method based on an entropy label in the related art.
Figure 4:
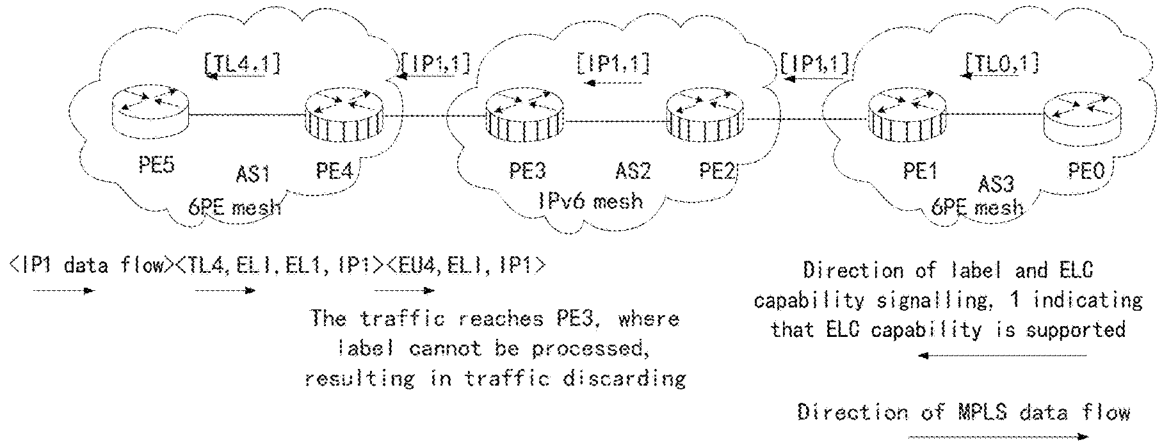
FIG. 4 is a schematic diagram of an exemplary traffic black hole generation process in the related art.
Figure 5:
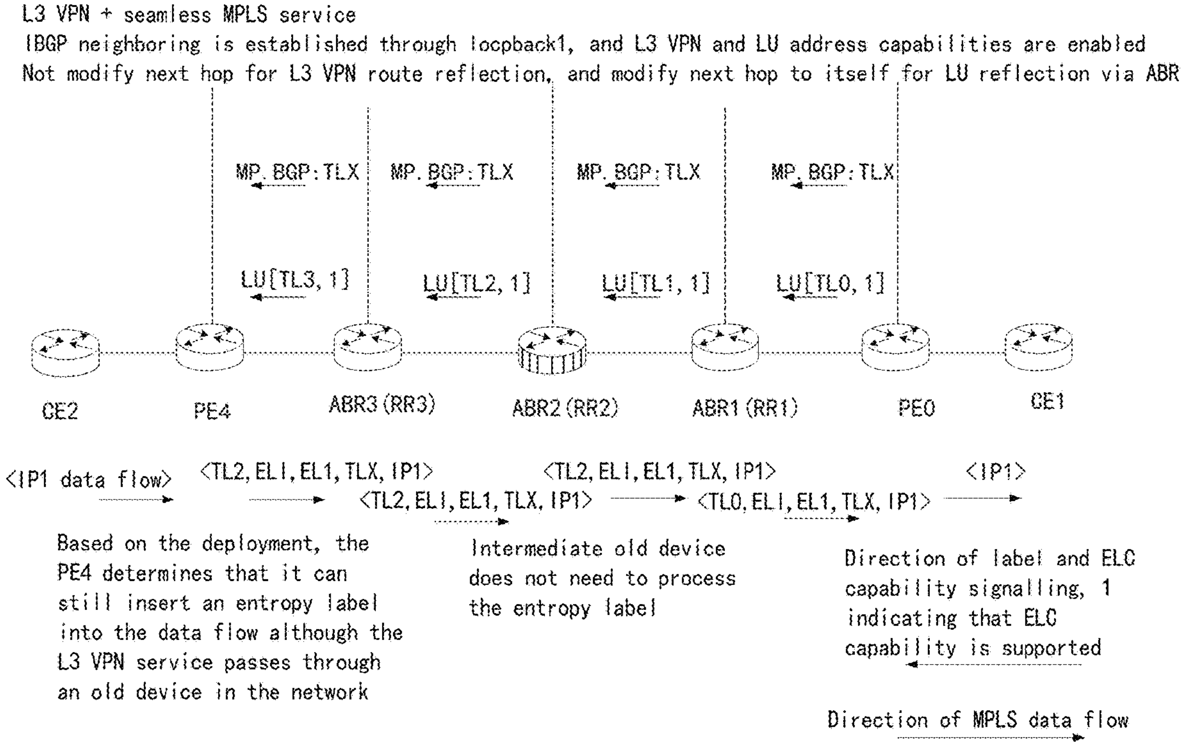
FIG. 5 is a schematic flowchart of another exemplary BGP route sending method based on an entropy label in the related art.

FIG. 2 is a flowchart of a BGP route sending method according to some embodiments of the present disclosure. As shown in FIG. 2, the BGP route sending method includes the following operations S202 to S206.

At operation S202, a second node receives a first BGP route advertised by a third node, wherein the first BGP route carries a first attribute and a second attribute.

At operation S204, the second node performs first processing on the second attribute to obtain a second BGP route, wherein the second node is located between the third node and a first node, the second node is unable to recognize the first attribute, but has a capability of recognizing the second attribute, and the first processing is modifying the second attribute by the second node.

At operation S206, in response to the second node being unable to recognize the first attribute, the second node adds first indication information to the second BGP route while retaining the first attribute in the second BGP route, and sends the second BGP route to the first node, wherein the first indication information is indication information used for indicating whether the first processing affects the first attribute.

In the embodiments of the present disclosure, a second node receives a first BGP route advertised by a third node, wherein the first BGP route carries a first attribute and a second attribute; the second node performs first processing on the second attribute to obtain a second BGP route, wherein the second node is located between the third node and a first node, the second node is unable to recognize the first attribute, but has a capability of recognizing the second attribute, and the first processing is modifying the second attribute by the second node; and in response to the second node being unable to recognize the first attribute, the second node adds first indication information to the second BGP route while retaining the first attribute in the second BGP route, and sends the second BGP route to the first node, wherein the first indication information is indication information used for indicating whether the first processing affects the first attribute. The technical solution provided in the embodiments of the present disclosure solves the technical problem in the related art that a receiving end is unable to recognize, in a transit sending process of a BGP route via an intermediate node, whether the intermediate node will prevent some BGP attributes in the BGP route from being applied to a forwarding plane, and particularly solves the problem of traffic black holes caused by the intermediate node through the affected BGP attributes. The technical solution provided in the embodiments of the present disclosure achieves the technical effects of shortening the range of network nodes needing to be upgraded and reducing the network maintenance cost.

It should be noted that, the second node being unable to recognize the first attribute refers to that the second node is unable to recognize a content part of the first attribute but is able to recognize some header information of the first attribute, for example, a flag bit in the Attr. Flags.

It should be noted that the embodiments of the present disclosure provide a BGP route sending method applied to the third node and the second node. The present embodiment provides a method for the third node to advertise one or more BGP route attributes to the first node through the second node, so that in a case where the second node is unable to recognize a certain BGP route attribute, the first node can know whether the second node will prevent the first node from applying the BGP route attribute to forwarding plane processing of a corresponding BGP route, in this way, better BGP route attribute forwarding may be implemented. The present embodiment may be implemented in different manners, and the details are described as follows.

Manner 1: the third node advertises the first BGP route to the second node, wherein the first BGP route carries a first attribute (for example, ELCA) and Xth indication information (namely, a new Smart-Partial flag), and the Xth indication information is used for instructing the second node to perform Yth processing and/or instructing the first node to perform Zth processing. The second node is a PE located between the third node and the first node, the second node forwards the first BGP route to the first node, the second node is a device unable to recognize the first attribute, and the first node is a device having a capability of recognizing the first attribute.

Manner 2: the third node advertises the first BGP route to the second node, wherein the first BGP route carries a first attribute (for example, ELCA) and Xth indication information (namely, a new New-Transitive flag), and the Xth indication information is used for instructing the second node to perform Yth processing and/or instructing the first node to perform Zth processing. The second node is a PE located between the third node and the first node, the second node forwards the first BGP route to the first node, the second node is a device unable to recognize the first attribute, and the first node is a device having a capability of recognizing the first attribute.

The Yth processing includes: in a case where a Yth condition is satisfied, when relaying the first BGP route to other nodes, the second node does not set a Partial flag for the first attribute, and at the same time, retains the Xth indication information unchanged; and in a case where the Yth condition is not satisfied, only when relaying the first BGP route to other nodes, the second node sets a Partial flag for the first attribute, and at the same time, retains the Xth indication information unchanged.

The Zth processing includes: in a case where the first attribute carries the Partial flag (namely, the first attribute carries a Partial flag with a value of 1), the first node does not add a first forwarding plane entity to a data packet corresponding to the first BGP route; and in a case where the first attribute does not carry the Partial flag (namely, the first attribute does not carry the Partial flag with the value of 1), the first node adds the first forwarding plane entity to the data packet corresponding to the first BGP route.

The Yth condition is that the second node satisfies one of the following conditions: the second node does not modify a next hop of the first BGP route; the second node modifies the next-hop of the first BGP route to the second node, but the second attribute carried by the second BGP route satisfies a sixth condition, wherein the sixth condition is that the second attribute (such as a VPN label) is modified together with the next hop, but the modified second attribute does not cause the first forwarding plane entity (such as an entropy label) to be exposed on the second node, wherein the second attribute is a route attribute corresponding to a second forwarding plane entity (a VPN label in the label stack) in the data packet encapsulation of the forwarding plane, and the second forwarding plane entity is a forwarding plane entity that is directly adjacent to the first forwarding plane entity in an outer layer (namely, the second forwarding plane entity is at the outer layer of the first forwarding plane entity and adjacent to the first forwarding plane entity) of the first forwarding plane entity (for example, an ELI label or a flow label).

It should be noted that, in some embodiments, the New-Transitive flag and the Smart-Partial flag, as well as a New-Partial flag, a No-Partial flag and a Partial-Disable flag in other embodiments, are flags in the Attr. Flags, and these flags are all located in four bits of the Attr. Flags that are not used currently (represented by bits numbered 4 to 7 in FIG. 7 and FIG. 10), wherein the Attr. Flags are the Attr. Flags defined on page 16 of the RFC4271 (also see FIG. 7).

In an embodiment, based on the described BGP route sending method, also proposed is a method for processing a BGP route attribute with a Partial flag, which is applied to the first node and the second node. The method is specifically described as follows.

The first node receives a first BGP route that carries a first attribute (such as ELCA) satisfying a ninth condition. The first node executes third processing when the first attribute further satisfies a seventh condition, and executes second processing when the first attribute does not satisfy the seventh condition. The ninth condition is that the Partial flag of the first attribute is 1. The seventh condition is that the first attribute carries third indication information (such as anew Partial-Disable flag). The third processing includes encapsulating the first forwarding plane entity into the data packet corresponding to the first BGP route. The second processing includes not encapsulating the first forwarding plane entity into the data packet corresponding to the first BGP route.

The Partial flag is set to 1 by the second node. The third indication information is used for indicating that the second node satisfies an eighth condition. The first forwarding plane entity (such as an entropy label) is a forwarding plane entity corresponding to the first attribute (such as an ELCA).

The eighth condition is that the second node satisfies one of the following conditions: the second node does not modify a next hop of the first BGP route; the second node modifies the next-hop of the first BGP route to the second node, and the second attribute carried by the second BGP route satisfies a tenth condition. The tenth condition is that the second attribute (such as a VPN label) is modified together with the next hop, but the modified second attribute does not cause the first forwarding plane entity (such as an entropy label) to be exposed on the second node.

In an exemplary embodiment, the method may further include: in a case where the first processing affects the first attribute, the first indication information further includes second indication information, and in a case where the first processing does not affect the first attribute, the first indication information further includes third indication information, wherein the second indication information is different from the third indication information, the second indication information is indication information used for instructing the first node to execute second processing, and the third indication information is indication information used for instructing the first node to perform third processing. The second processing may include that: in a case where the second BGP route carries the second indication information, the first node does not add a first forwarding plane entity to a data packet corresponding to the second BGP route, wherein the first forwarding plane entity is a forwarding plane entity corresponding to the first attribute. The third processing may include that: in a case where the second BGP route carries the third indication information, the first node adds the first forwarding plane entity to the data packet corresponding to the second BGP route, wherein the first forwarding plane entity is the forwarding plane entity corresponding to the first attribute.

In an exemplary embodiment, the first attribute, the first forwarding plane entity, and the second attribute satisfy one of a third condition, a fourth condition, and a fifth condition, wherein the third condition includes: the first attribute being an Entropy Label Capability Attribute (ELCA), the first forwarding plane entity being an Entropy Label Indicator (ELI) label corresponding to the ELCA, and the second attribute being a Multi-Protocol Label Switching (MPLS) label attribute of the first BGP route; the fourth condition includes: the first attribute being a Flow Label Capability Attribute (FLCA), the first forwarding plane entity being a flow label corresponding to the FLCA, and the second attribute being the MPLS label attribute of the first BGP route; the fifth condition includes: the first attribute being a Control Word Capability Attribute (CWCA), the first forwarding plane entity is a control word corresponding to the CWCA, and the second attribute is the MPLS label attribute of the first BGP route.

It should be noted that, in some embodiments, both the FLCA and the CWCA are Extended Community attributes of EVPN Layer 2 Attributes, wherein the flow label capability and the control word capability are respectively one flag bit of the Extended Community attributes, and the ELCA is an entropy label capability attribute defined in the RFC6790.

In an exemplary embodiment, the method further includes: the first BGP route further carries fourth indication information, and the second node determines, according to the fourth indication information, that the third indication information is fifth indication information, wherein the fifth indication information includes a Partial flag bit with a value of 0.

In an exemplary embodiment, the first BGP route further carries fourth indication information; the second node determines, according to the fourth indication information, that the second indication information includes one of sixth indication information or seventh indication information, or determines, according to the fourth indication information, that the third indication information includes eighth indication information, wherein the sixth indication information includes a No-Partial flag bit with a value of 0, and the fourth indication information is kept unchanged; the seventh indication information includes a New-Partial flag bit with a value of 1, and the fourth indication information is kept unchanged; and the eighth indication information includes a Partial flag bit with a value of 0, and the fourth indication information is kept unchanged.

In an exemplary embodiment, before the second node receives the first BGP route advertised by the third node, the method further includes: the third node adds the fourth indication information into the first BGP route.

In an exemplary embodiment, only when all modifications performed on attributes other than the first attribute in the first BGP route do not affect validity of the first attribute, the second node adds the third indication information to the second BGP route when sending the second BGP route to the first node.

In an exemplary embodiment, the fourth indication information is ninth indication information, wherein the ninth indication information is formed by a Transitive flag bit located in the first attribute and having a value of 1 and a Smart-Partial flag bit located in the first attribute and having a value of 1.

In an exemplary embodiment, the fourth indication information is tenth indication information, wherein the tenth indication information is formed by a Transitive flag bit located in the first attribute and having a value of 0 and a New-Transitive flag bit located in the first attribute and having a value of 1.

In an exemplary embodiment, in a case where a first condition is not satisfied, it is determined that the first processing affects the first attribute; or in a case where the first condition is satisfied, it is determined that the first processing does not affect the first attribute, wherein the first condition includes one of the following: the second node does not modify a next hop of the first BGP route; the second node modifies an address of the next-hop of the first BGP route to an IP address of the second node, and the second attribute carried by the second BGP route satisfies a second condition.

In an exemplary embodiment, the second condition includes that the second attribute does not cause the first forwarding plane entity to be exposed on the second node.

In an exemplary embodiment, the second condition includes that the second attribute does not cause a second forwarding plane entity to be stripped off on the second node, wherein the second forwarding plane entity is a forwarding plane entity adjacent to the first forwarding plane entity in an outer layer of the first forwarding plane entity.

In an exemplary embodiment, the second attribute is a first Multi-Protocol Label Switching (MPLS) label of the first BGP route, the first processing is modifying, by the second node, the first MPLS label of the first BGP route to a second MPLS label allocated by the second node, and the method further includes: in a case where a label operation corresponding to the second MPLS label on a forwarding plane is Swap, adding the third indication information before the second node advertises the second BGP route to the first node; in a case where the label operation corresponding to the second MPLS label in the forwarding plane is Pop, adding the second indication information before the second node advertises the second BGP route to the first node.

In an exemplary embodiment, the third indication information includes a Partial flag bit with a value of 0 in the first attribute.

In an exemplary embodiment, the fourth indication information is a New-Transitive flag bit in the first attribute, and the method further includes: setting, by the third node, the value of the No-Partial flag bit to 1 before advertising the first BGP route; in response to a value of the New-Transitive flag bit being 1, determining, by the second node, that the third indication information includes the No-Partial flag bit with the value of 1 in the first attribute and a Transitive flag bit with a value of 0.

In an exemplary embodiment, the fourth indication information is a Smart-Partial flag bit in the first attribute, and the method further includes: in response to a value of the Smart-Partial flag bit being 1, determining that the second indication information includes the Partial flag bit with the value of 1 in the first attribute.

In an exemplary embodiment, the first processing is processing not affecting the first attribute, there is a fourth node between the first node and the third node, the fourth node is a node which is unable to recognize a New-Transitive flag bit, a Smart-Partial flag bit, a New-Partial flag bit, a No-Partial flag bit and the first attribute, the fourth node sends a fifth BGP route to the first node, the second node and the fourth node both modify the second attribute without affecting the first attribute, and the third indication information is different from a value of a corresponding field in the fifth BGP route.

It should be noted that, the first node in the above embodiment may be understood as a first PE, the second node may be understood as a second PE, the third node may be understood as a third PE, and the fourth node may be understood as a fourth PE, which are not limited in the embodiments of the present disclosure.

Figure 6:
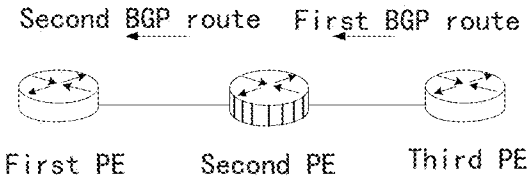
FIG. 6 is a schematic flowchart (1) of an exemplary BGP route sending method according to some embodiments of the present disclosure.

In an embodiment, the BGP route sending method will be described with reference to FIG. 6. FIG. 6 is a schematic flowchart (1) of an exemplary BGP route sending method according to some embodiments of the present disclosure, and as shown in FIG. 6:

the third PE advertises a BGP route to the first PE through the second PE, wherein the BGP route at least includes an optional and transitive BGP route attribute that cannot be recognized by the second PE; on a precondition that the second PE is unable to recognize the BGP route attribute, if the first PE, when forwarding the data packet P0 according to the BGP route, inserts a "forwarding plane entity indicated by the BGP route attribute" into the data packet P0 (to obtain a data packet referred to as P0b), the data packet P0 may pass through the second PE, or may be discarded by the second PE, depending on what conditions the processing of the BGP route by the second PE satisfies, wherein when the processing of the BGP route by the second PE satisfies a first type of condition, the second PE may determine that the second PE can forward the P0b, and when the processing of the BGP route by the second PE satisfies a second type of condition, the second PE may determine to discard the P0b; therefore, it may be beneficial that the second PE notifies, by some mechanism, the first PE whether the second PE is able to forward the P0b, thereby helping the first PE decide whether to insert the "data plane entity indicated by the BGP route attribute" into the data packet P0.

It should be noted that the BGP route may be a BGP route such as a BGP Label Unicast (BGP-LU) route, an Ethernet Virtual Private Network (EVPN) route, or an Layer 3 Virtual Private Network (L3VPN) route, and the BGP route attribute may be an Entropy Label Capability (ELC) attribute, an attribute indicating a flow label capability, or an attribute indicating a control word capability. The data plane entity indicated by the ELCA may be an Entropy Label (EL) and an Entropy Label Indicator (ELI), a data plane entity indicated by the attribute indicating the flow label capability may be a flow label, and a data plane entity indicated by the attribute indicating the control word capability may be a control word.

The BGP route sending method is further described with reference to the following embodiments.

Embodiment 1

Figure 7:
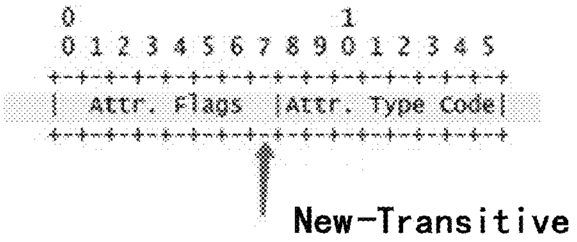
FIG. 7 is a schematic structural diagram (1) of an ELCA in an exemplary BGP route sending method according to some embodiments of the present disclosure.

In the present embodiment, a BGP route sending process is described with reference to FIG. 7. FIG. 7 is a schematic structural diagram (1) of an ELCA in an exemplary BGP route sending method according to some embodiments of the present disclosure. As shown in FIG. 7, the BGP route sending process includes the following operations S101000-S104000.

At operation S101000, a third PE advertises a first BGP route to a second PE, wherein the first BGP route carries an Entropy Label Capability Attribute (ELCA), and the ELCA carries a New-Transitive flag bit and a Transitive flag bit with a value of 0, as shown in FIG. 7.

At operation S102000, the second PE receives the first BGP route. The second PE has a capability of recognizing the first BGP route, but is unable to recognize the ELCA.

At operation S103000, the second PE modifies an address of a next hop of the first BGP route to an IP address identifying the second PE, meanwhile, the second PE modifies an MPLS label of the first BGP route to an MPLS label (denoted as L1) allocated by the second PE, so as to obtain a second BGP route. Then, in response to the value of the New-Transitive flag bit being 1, the second PE advertises the second BGP route to a first PE.

The operation S103000 further includes the following operations S103010 and S103020.

At operation S103010, in a case where a label operation corresponding to the label L1 on the forwarding plane is Swap, before the second PE advertises the first BGP route to the first PE, in response to the value of the New-Transitive flag bit being 1, the second PE does not set the Partial flag bit in the ELCA to 1, and at the same time, retains the New-Transitive flag bit unchanged.

At operation S103020, in a case where the label operation corresponding to the label L1 on the forwarding plane is Pop, before the second PE advertises the second BGP route to the first PE, the second PE sets the Partial flag bit in the ELCA to 1, and at the same time, retains the New-Transitive flag bit unchanged.

At operation S104000, the first PE receives the second BGP route. When the first PE forwards a data packet P1 according to the second BGP route, according to the Partial flag in the ELCA of the second BGP route, the first PE judges whether the second PE will prevent adding an entropy label to the data packet P1, and according to whether the second PE will prevent adding the entropy label to the data packet P1, determines whether to add the entropy label to the data packet P1.

The operation S104000 further includes the following operations S104011 and S104021.

At operation S104011, the first PE receives the first BGP route, and in a case where the Partial flag in the ELCA of the second BGP route is 1, the first PE does not insert the entropy label into the data packet P1 when forwarding the data packet P1 according to the second BGP route.

At operation S104021, the first PE receives the second BGP route, and in a case where the Partial flag in the ELCA of the second BGP route is 0, the first PE inserts the entropy label into the data packet P1 when forwarding the data packet P1 according to the first BGP route.

Embodiment 2

At operation S201000, a third PE advertises a first BGP route to a second PE, wherein the first BGP route carries an Entropy Label Capability Attribute (ELCA), and the ELCA does not carry a New-Transitive flag bit, but carries a Transitive flag bit with a value of 1.

At operation S202000, the second PE receives the first BGP route. The second PE has a capability of recognizing the first BGP route but is unable to recognize the ELCA.

At operation S203000, the second PE modifies an address of a next hop of the first BGP route to an IP address identifying the second PE, meanwhile, the second PE modifies an MPLS label of the first BGP route to an MPLS label (denoted as L1) allocated by the second PE, so as to obtain a second BGP route. Then the second PE advertises the second BGP route to a first PE.

The operation S203000 further includes the following operations S203010 and S203020.

At operation S203010, in a case where a label operation corresponding to the label L1 on the forwarding plane is Swap, before the second PE advertises the first BGP route to the first PE, the second PE does not set the Partial flag bit in the ELCA to 1.

At operation S203020, in a case where the label operation corresponding to the label L1 on the forwarding plane is Pop, before the second PE advertises the first BGP route to the first PE, the second PE sets the Partial flag bit in the ELCA to 1. It should be noted that, because the forwarding plane of the second node does not support an entropy label, in this case, if the first PE sends an entropy label to the second PE according to the ELAC, a traffic black hole may be caused, and therefore, the value of the Partial flag bit being set to 1 may be used as a basis for determining that the first PE determines that the second PE may cause a traffic black hole by means of the ELCA. Similar cases will not be repeatedly described.

At operation S204000, the first PE receives the second BGP route. When the first PE forwards a data packet P2 according to the second BGP route, according to the Partial flag in the ELCA of the second BGP route, the first PE judges whether the second PE will prevent adding an entropy label to the data packet P2, and according to whether the second PE will prevent adding the entropy label to the data packet P2, determines whether to add the entropy label to the data packet P2. Similar cases will not be repeatedly described.

The operation S204000 further includes the following operations S204011 and S204021.

At operation S204011, the first PE receives the second BGP route, and in a case where the Partial flag in the ELCA of the second BGP route is 1, the first PE does not insert the entropy label into the data packet P2 when forwarding the data packet P2 according to the second BGP route.

At operation S204021, the first PE receives the second BGP route, and in a case where the Partial flag in the ELCA of the second BGP route is 0, the first PE inserts the entropy label into the data packet P2 when forwarding the data packet P2 according to the second BGP route.

Embodiment 3

Figure 8:
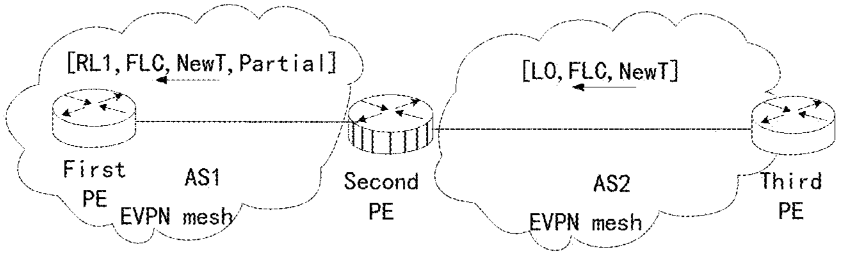
FIG. 8 is a schematic flowchart (2) of an exemplary BGP route sending method according to some embodiments of the present disclosure.

In the present embodiment, the BGP route sending process is described with reference to FIG. 8. FIG. 8 is a schematic flowchart (2) of an exemplary BGP route sending method according to some embodiments of the present disclosure. As shown in FIG. 8, the BGP route sending process includes the following operations S301000 to S303000.

At operation S301000, a third PE advertises a first BGP route to a second PE, wherein a BGP attribute that cannot be recognized by the second PE and is carried by the first BGP route is an EVPN layer 2 Attribute Extended Community attribute (namely, a Flow Label Capability (FLC) Attribute (FLCA)), the FLCA carries a New-Transitive flag bit (denoted by “NewT” in FIG. 8) and a Transitive flag bit with a value of 0, wherein the first BGP route is a first-type EVPN route, and the MPLS label is an MPLS label in Network Layer Reachability Information (NLRI) of the first-type EVPN route.

At operation S302000, the second PE receives the first BGP route. The second PE has a capability of recognizing the first BGP route but is unable to recognize the ELCA.

At operation S303000, the second PE modifies an address of a next hop of the first BGP route to an IP address identifying the second PE, and at the same time, the second PE modifies an MPLS label (denoted as L0 in FIG. 8) of the first BGP route to an MPLS label (denoted as RL1) allocated by the second PE, so as to obtain a second BGP route. Then, the second PE advertises the second BGP route to a first PE, so that the first PE determines whether to send a flow label to the second PE.

The operation S303000 further includes the following operations S303010 to S303020.

At operation S303010, in a case where a label operation corresponding to the label RL1 on the forwarding plane is Swap, before the second PE advertises the second BGP route to the first PE, in response to the value of the New-Transitive flag bit being 1, the second PE does not set the Partial flag bit in the FLCA to 1, and at the same time, retains the New-Transitive flag bit unchanged.

At operation S303020, in a case where the label operation corresponding to the label RL1 of the forwarding plane is Pop, before the second PE advertises the second BGP route to the first PE, the second PE sets the Partial flag bit in the FLCA to 1, and at the same time, retains the New-Transitive flag bit unchanged.

At operation S303011, the first PE receives the second BGP route, and in a case where the Partial flag in the FLCA of the second BGP route is 1, the first PE does not insert the flow label into a data packet P3 when forwarding the data packet P3 according to the second BGP route.

At operation S303021, the first PE receives the second BGP route, and in a case where the Partial flag in the FLCA of the second BGP route is 0, the first PE inserts the flow label into the data packet P3 when forwarding the data packet P3 according to the second BGP route.

It should be noted that a plurality of extended community attributes may be published by being packaged together, and in this case, these extended community attributes share the same Attr. Flags and the same Attr. Type Code. When the EVPN layer 2 Attributes Extended Community needs to be set with a New-Transitive flag and/or a Partial flag while the other extended community attributes do not need to be set with the New-Transitive flag and/or the Partial flag, the two sets of extended community attributes need to be packaged separately.

Embodiment 4

At operation S401000, a third PE advertises a first BGP route to a second PE, wherein a BGP attribute that cannot be recognized by the second PE and is carried by the first BGP route is a C flag (namely, a control word capability flag) in an EVPN Layer 2 Attribute Extended Community, and the CWCA carries a New-Transitive flag bit and a Transitive flag bit with a value of 0, wherein the first BGP route is a first-type EVPN route, and the MPLS label is an MPLS label in an NLRI of the first-type EVPN route.

At operation S402000, the second PE receives the first BGP route. The second PE has a capability of recognizing the first BGP route but is unable to recognize the ELCA.

At operation S403000, the second PE modifies an address of a next hop of the first BGP route to an IP address identifying the second PE, and meanwhile, the second PE modifies an MPLS label of the first BGP route to an MPLS label (denoted as L1) allocated by the second PE, so as to obtain a second BGP route. Then, the second PE advertises the second BGP route to a first PE, so that the first PE determines whether to send a control word to the second PE.

The operation 403000 further includes the following operations:

At operation S403010, in a case where a label operation corresponding to the label L1 on the forwarding plane is Swap, before the second PE advertises the second BGP route to the first PE, in response to the value of the New-Transitive flag bit being 1, the second PE does not set the Partial flag bit in the CWCA to 1, and at the same time, retains the New-Transitive flag bit unchanged.

At operation S403020, in a case where the label operation corresponding to the label L1 on the forwarding plane is Pop, before the second PE advertises the second BGP route to the first PE, the second PE sets the Partial flag bit in the CWCA to 1, and at the same time, retains the New-Transitive flag bit unchanged.

At operation S403011, the first PE receives the second BGP route, and in a case where the Partial flag in the CWCA of the second BGP route is 1, the first PE does not insert the control word capability label into the data packet P3 when forwarding the data packet P3 according to the second BGP route.

At operation S403021, the first PE receives the second BGP route, and in a case where the Partial flag in the CWCA of the second BGP route is 0, the first PE inserts the control word capability label into the data packet P3 when forwarding the data packet P3 according to the second BGP route.

Embodiment 5

Figure 9:
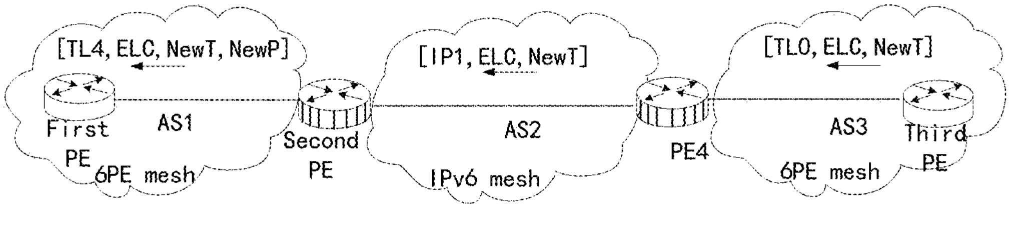
FIG. 9 is a schematic flowchart (3) of an exemplary BGP route sending method according to some embodiments of the present disclosure.

In the present embodiment, the BGP route sending process is described with reference to FIG. 9. FIG. 9 is a schematic flowchart (3) of an exemplary BGP route sending method according to some embodiments of the present disclosure, as shown in FIG. 9, the BGP route sending process includes the following operations.

Unless otherwise specified, the operations in the present embodiment are the same as those in Embodiment 1.

The difference between the present embodiment and Embodiment 1 lies in that:

1) In the present embodiment, another node exists between the second PE and the third PE, for example, the fourth PE (i.e., PE4) node shown in the figure. In this case, PE4 may modify the original first BGP route, for example, the PE4 node in the figure may remove the MPLS label (indicated by TL0 in FIG. 9) from the original first BGP route while transparently transmitting the ELCA, and in such a case, the second PE receives the first BGP route from the PE4, and this is the first BGP route received by the second PE from the third PE.

2) In the present embodiment, a new New-Partial flag (denoted by NewP in FIG. 9) is used to replace the Partial flag in Embodiment 1, wherein the New-Partial flag being 0 is equivalent to the Partial flag being 0, and the New-Partial flag being 1 is equivalent to the Partial flag being 1.

It should be noted that, because the first BGP route received by the second PE does not have an MPLS label, correspondingly, in the present embodiment, the operation that "the second PE modifies an MPLS label of the first BGP route" refers to the operation of adding a route attribute that carries the MPLS label (represented by TL4 in FIG. 9).

Embodiment 6

Unless otherwise specified, the operations in the present embodiment are the same as those in Embodiment 5.

The difference between the present embodiment and Embodiment 5 lies in that:

1) In the present embodiment, a new No-Partial flag field is used to replace the New-Partial flag field, the No-Partial flag being 0 is equivalent to the Partial flag being 1 in Embodiment 1, and the No-Partial flag being 1 is equivalent to the Partial flag being 0 in Embodiment 1.

2) In cases where the New-Partial flag is set to 0 in Embodiment 5, the No-Partial flag is set to 1 in the present embodiment, and in cases where the New-Partial flag is set to 1 in Embodiment 5, the No-Partial flag is set to 0 in the present embodiment.

It should be noted that, in the present embodiment, when the third PE sends the first BGP route to PE4, No-Partial needs to be set to 1.

Embodiment 7

Figure 10:
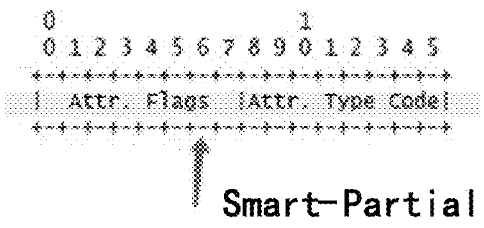
FIG. 10 is a schematic structural diagram (2) of an ELCA in an exemplary BGP route sending method according to some embodiments of the present disclosure.

In the present embodiment, the BGP route sending process is described with reference to FIG. 10. FIG. 10 is a schematic structural diagram (2) of an ELCA in an exemplary BGP route sending method according to some embodiments of the present disclosure, and as shown in FIG. 10, BGP route sending process includes the following operations S701000 to S703000.

Figure 11:
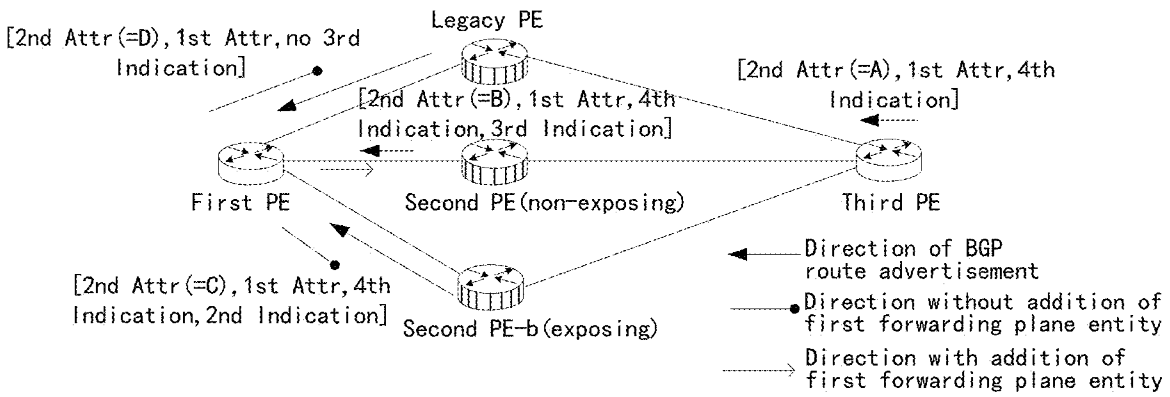
FIG. 11 is a schematic flowchart (4) of an exemplary BGP route sending method according to some embodiments of the present disclosure.

At operation S701000, a third PE advertises a first BGP route to a second PE, wherein the first BGP route carries an Entropy Label Capability Attribute (ELCA), and the ELCA carries a Smart-Partial flag bit with a value of 1 and a Transitive flag bit with a value of 1, as shown in FIG. 11.

At operation S702000, the second PE receives the first BGP route. The second PE has a capability of recognizing the first BGP route but is unable to recognize a belonging ELCA.

At operation S703000, the second PE modifies a next hop of the first BGP route to an IP address identifying the second PE, and meanwhile, the second PE modifies an MPLS label of the first BGP route to an MPLS label (denoted as L1) allocated by the second PE, so as to obtain a second BGP route. Then, the second PE advertises the first BGP route to the first PE, so that the second PE determines whether to send an entropy label to the first PE.

The operation S703000 further includes the following operations S703010 and S703020.

At operation S703010, in a case where a label operation corresponding to the label L1 on the forwarding plane is Swap, before the second PE advertises the second BGP route to the first PE, in response to the value of the Smart-Partial flag bit being 1, the second PE does not set the Particle flag bit in the ELCA to 1, and at the same time, retains the Smart-Partial flag bit unchanged.

At operation S703020, in a case where the label operation corresponding to the label L1 on the forwarding plane is Pop, before the second PE advertises the second BGP route to the first PE, the second PE sets the Partial flag bit in the ELCA to 1, and at the same time, retains the Smart-Partial flag bit unchanged.

At operation S703011, the first PE receives the second BGP route, and in a case where the Partial flag in the ELCA of the second BGP route is 1, the first PE does not insert the entropy label into a data packet P7 when forwarding the data packet P7 according to the second BGP route.

At operation S703021, the first PE receives the second BGP route, and in a case where the Partial flag in the ELCA of the second BGP route is 0, the first PE inserts the entropy label into the data packet P7 when forwarding the data packet P7 according to the second BGP route.

Embodiment 8

In the present embodiment, the BGP route sending process is described with reference to FIG. 11 and FIG. 12. FIG.

Figure 12:
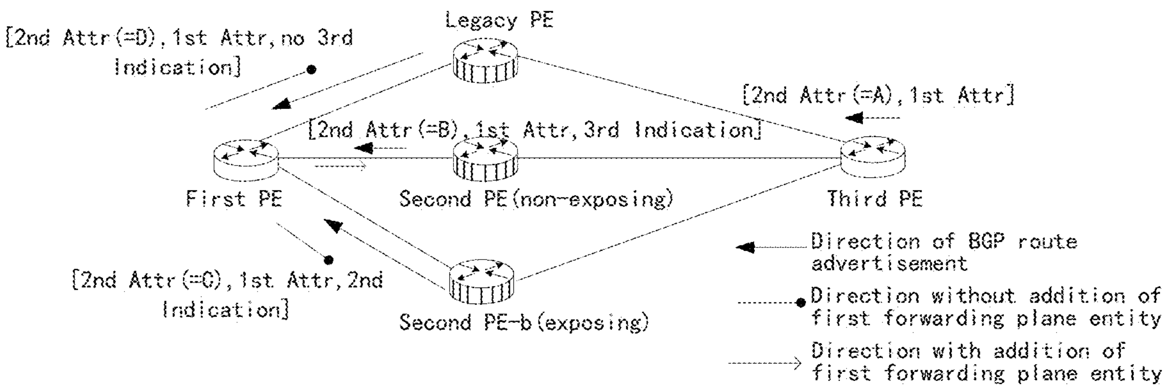
FIG. 12 is a schematic flowchart (5) of an exemplary BGP route sending method according to some embodiments of the present disclosure.

11 and FIG. 12 are schematic flowcharts of two exemplary BGP route sending methods according to the embodiments of the present disclosure. As shown in FIG. 11 and FIG. 12, the BGP route sending process includes the following operations.

Unless otherwise specified, the operations in the present embodiment are the same as those in Embodiment 7.

The difference between the present embodiment and Embodiment 7 lies in that:

1) As shown in the figures, in the present embodiment, a legacy PE (corresponding to the fourth PE node) exists between the third PE and the first PE, and the legacy PE does not transparently transmit the value of the Smart-Partial flag (corresponding to the fourth indication information).
2) In the present embodiment, in operation S703011, in a case where the Partial flag in the ELCA of the second BGP route is 1, when the data packet P1 is forwarded according to the second BGP route, the entropy label is not inserted into the data packet P1.
3) In the present embodiment, in operation S703021, in a case where the Partial flag in the ELCA of the second BGP route is 0, when the data packet P1 is forwarded according to the second BGP route, the entropy label is inserted into the data packet P1.

It should be noted that, the meaning of "exposing" and "non-exposing" mentioned in FIG. 11 and FIG. 12 is explained as follows.

If the second PE modifies the second attribute and the modification of the second attribute by the second PE does not cause the second forwarding plane entity to be stripped on the second PE, then for the first attribute, the second PE is a non-exposing node with respect to the second attribute, wherein the second forwarding plane entity is a forwarding plane entity adjacent to the first forwarding plane entity in an outer layer of the first forwarding plane entity, and the first forwarding plane entity is a forwarding plane entity corresponding to the first attribute. On the contrary, if the second PE modifies the second attribute and the modification of the second attribute by the second PE causes the second forwarding plane entity to be stripped off on the second PE, then for the first attribute, the second PE is an exposing node with respect to the second attribute.

Further, if the first attribute may have an exposing node with respect to some other route attribute, then the first attribute is referred to as an exposable route attribute, otherwise, the first attribute is referred to as a non-exposable (i.e., impossible to be exposed) route attribute. Routing attributes that do not have a corresponding entity in the forwarding plane are all non-exposable routing attributes. Only for exposable routing attributes, the third PE needs to add a Smart-Partial flag. For non-exposable routing attributes (especially new non-exposable routing attributes that may appear in the future), the third PE does not need to add the Smart-Partial flag.

It should be noted that, in the present embodiment, if the first processing is processing not affecting the first attribute (namely, not causing the first forwarding plane entity corresponding to the first attribute to be exposed on the second PE) (namely, the second PE being a non-exposing PE), and if a legacy PE (corresponding to the fourth PE) exists between the first PE and the third PE, the legacy PE is a node which is unable to recognize a New-Transitive flag bit, a Smart-Partial flag bit, a New-Partial flag bit, a No-Partial flag bit and the first attribute, and the legacy PE modifies a next hop of the first BGP route to an IP address identifying the fourth PE, so as to obtain a fifth BGP route, the legacy PE sends the fifth BGP route to the first PE, the second PE and the legacy PE modifies the second attribute without affecting the first attribute, the method further includes the following operation.

The third indication information is different from a value of a corresponding field in the fifth BGP route.

Embodiment 9

At operation S901000, a third PE advertises a first BGP route to a second PE, wherein the first BGP route carries an Entropy Label Capability Attribute (ELCA), and the ELCA does not carry a New-Transitive flag bit, but carries a Transitive flag bit with a value of 1.

At operation S902000, the second PE receives the first BGP route. The second PE has a capability of recognizing the first BGP route but is unable to recognize the ELCA.

At operation S903000, the second PE modifies a next hop of the first BGP route to an IP address identifying the second PE, and meanwhile, the second PE modifies an MPLS label of the first BGP route to an MPLS label (denoted as L1) allocated by the second PE, so as to obtain a second BGP route. The second PE advertises the second BGP route to the first PE to instruct the first PE whether to encapsulate an entropy label for the second PE.

The operation S903000 further includes the following operations S903010 to S903031.

At operation S903010, in a case where a label operation corresponding to the label L1 on the forwarding plane is Swap, before the second PE advertises the second BGP route to the first PE, the second PE sets the Partial flag bit in the ELCA to 1, and meanwhile, sets the Partial-Disabled flag bit in the ELCA to 1.

At operation S903020, in a case where the label operation corresponding to the label L1 on the forwarding plane is Pop, before the second PE advertises the second BGP route to the first PE, the second PE sets the Partial flag bit in the ELCA to 1, and meanwhile, does not set the Partial-Disabled flag bit in the ELCA to 1.

At operation S903011, the first PE receives the second BGP route, and in a case where the Partial flag in the ELCA of the second BGP route is 1 and the value of the Partial-Disabled flag in the ELCA is 0, the first PE does not insert the entropy label into a data packet P9 when forwarding the data packet P9 according to the second BGP route.

At operation S903021, the first PE receives the second BGP route, and in a case where the Partial flag in the ELCA of the second BGP route is 1 and the value of the Partial-Disabled flag in the ELCA is 1, the first PE inserts the entropy label into the data packet P9 when forwarding the data packet P9 according to the second BGP route.

At operation S903031, the first PE receives the second BGP route, and in a case where the Partial flag in the ELCA of the second BGP route is 0 and the value of the Partial-Disabled flag in the ELCA is 0, the first PE inserts the entropy label into the data packet P9 when forwarding the data packet P9 according to the second BGP route.

It should be noted that, in the present embodiment, when there is a fifth PE between the second PE and the first PE, the fifth PE receives the first BGP route from the second PE and sends the modified first BGP route to the first PE, and at this time, the fifth PE needs to modify the value of the Partial-Disabled flag according to its own condition, and cannot always transparently transmit the received value of the Partial-Disabled flag. Since the Partial flag cannot be modified once being set to 1, the property of the Partial-Disabled flag that the Partial-Disabled flag is able to be modified by each intermediate node may make maximum use of the entropy label capability of each intermediate node, rather than having no entropy label encapsulation on the ingress node as long as any intermediate node has no entropy label capability.

In the foregoing embodiments, a BGP route sending method is provided for achieving the advertisement of a BGP route by the third PE to the first PE through the second PE, so that in a case where the second PE is unable to recognize a BGP route attribute, the first PE can know whether the second PE will prevent the first PE from applying the BGP route attribute to a forwarding plane of a corresponding BGP route, thereby solving the dilemma caused by the fact that the first PE is unable to recognize "whether the second PE will prevent the first PE from applying the BGP route attribute to a forwarding plane of a corresponding BGP route". The embodiments of the present disclosure enable a new BGP route attribute advertised by a new node in the future to safely traverse nodes that implement the solution of the embodiments of the present disclosure and that cannot recognize the new BGP route attribute, thereby achieving the technical effects of shortening the range of network nodes needing to be upgraded and reducing the network maintenance cost.

Figure 13:
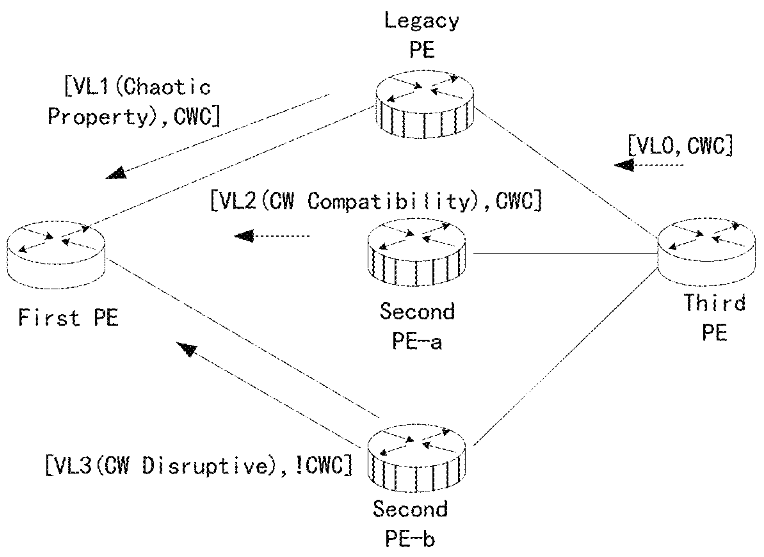
FIG. 13 is a flowchart of an exemplary BGP route sending method with legacy PEs according to some embodiments of the present disclosure.

FIG. 13 is a flowchart of an exemplary BGP route sending method with legacy PEs according to some embodiments of the present disclosure. An embodiment is described as follows with reference to FIG. 13.

The legacy PE is an existing node that does not support the Control Word Capability (CWC) negotiation, and the second PE-a and the second PE-b are nodes that do not support the control word capability negotiation but support the embodiments of the present disclosure. After receiving an EVPN route, the legacy PE, the second PE-a and the second PE-b all modify the EVPN label (VL) thereof and the next hop, and then forward the EVPN route to the first PE, wherein VL3 is an EVPN label having control word disruptive property (namely, being CW disruptive, that is, for CWCA, the second PE-b is an exposing node with respect to the EVPN label), VL2 is an EVPN label that does not have control word disruptive property (namely, having CW compatibility, that is, for CWCA, the second PE-a is a non-exposing node with respect to the EVPN label), and VL1 is an EVPN label that has chaotic property (may or may not be CW disruptive, and there lacks indication information indicating whether the EVPN label is CW disruptive).

By means of the present embodiment, when the first PE may add a control word when sending data to the second PE-a (because the second PE-a indicates that a route advertised thereby has CW compatibility), and the first PE may not add the control word when sending a data packet to the second PE-b and the legacy PE, thereby making maximum use of the control word capability.

The BGP route sending method according to the embodiments of the present disclosure realizes that a third PE advertises BGP route attributes to a first PE through a second PE, that is, on the premise that the second PE is not upgraded, a new BGP attribute may be securely extended between the first PE and the third PE, furthermore, when the second PE prevents the first PE from applying the new BGP attribute to the forwarding plane, the first PE can handle differently from cases in which the second PE does not prevent the first PE from applying the new BGP attribute to the forwarding plane, therefore, the application scope of the new BGP attribute is improved, and the complexity of network management is simplified.

When nodes implementing the embodiments of the present disclosure are hybrid networked with legacy PEs, for newly added BGP route attributes, even though some intermediate nodes are unable to recognize these new BGP route attributes, these intermediate nodes can still indicate to the head node (for example, the first PE) whether the modifications on the first BGP route by these intermediate nodes have CW compatibility. This allows the head node to handle differently depending on different intermediate nodes. Moreover, the response to the indication information will not cause the ingress node to also add control words for legacy PEs (which all advertise chaotic EVPN labels).

Through the description of the foregoing embodiments, those having ordinary skill in the art may clearly understand that the method according to the foregoing embodiments may be implemented by software in addition to a necessary general purpose hardware platform, and definitely may also be implemented by hardware. However, in many cases, the former is a preferred implementation. Based on such understanding, the essence of the technical solutions of the present disclosure or the part contributing to the related art may be embodied in the form of a software product. The computer software product is stored in a storage medium (such as a Read-Only Memory (ROM)/Random Access Memory (RAM), a magnetic disk, or an optical disk), and includes several instructions for instructing a terminal device (which may be a mobile phone, a computer, a server, or a network apparatus) to execute the methods of the embodiments of the present disclosure.

The present embodiment further provides a BGP route sending device, which is configured to implement the foregoing embodiments and exemplary implementations, and what has been described is not repeated herein. The term "module", as used hereinafter, is a combination of software and/or hardware capable of realizing a predetermined function. Although the device described in the following embodiment is preferably implemented by software, implementation of hardware or a combination of software and hardware is also possible and conceived.

Figure 14:
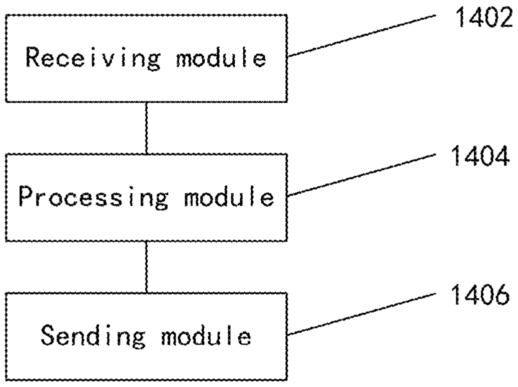
FIG. 14 is a structural block diagram of a BGP route sending device according to some embodiments of the present disclosure.

FIG. 14 is a structural block diagram of a BGP route sending device according to some embodiments of the present disclosure. As shown in FIG. 14, the BGP route sending device includes:

- a receiving module 1402, configured to receive a first BGP route advertised by a third node, wherein the first BGP route carries a first attribute and a second attribute;
- a processing module 1404, configured to perform first processing on the second attribute to obtain a second BGP route, wherein the second node is located between the third node and a first node, the second node is unable to recognize the first attribute, but has a capability of recognizing the second attribute, and the first processing is modifying the second attribute by the second node; and
- a sending module 1406, configured to, in response to the second node being unable to recognize the first attribute, add first indication information to the second BGP route while retaining the first attribute in the second BGP route, and send the second BGP route to the first node, wherein the first indication information is indication information used for indicating whether the first processing affects the first attribute.

By means of the device, a second node receives a first BGP route advertised by a third node, wherein the first BGP route carries a first attribute and a second attribute; the second node performs first processing on the second attribute to obtain a second BGP route, wherein the second node is located between the third node and a first node, the second node is unable to recognize the first attribute, but has a capability of recognizing the second attribute, and the first processing is modifying the second attribute by the second node; and in response to the second node being unable to recognize the first attribute, the second node adds first indication information to the second BGP route while retaining the first attribute in the second BGP route, and sends the second BGP route to the first node, wherein the first indication information is indication information used for indicating whether the first processing affects the first attribute. The technical solution provided in the embodiments of the present disclosure solves the technical problem in the related art that a receiving end is unable to recognize, in a transit sending process of a BGP route via an intermediate node, whether the intermediate node will prevent some BGP attributes in the BGP route from being applied to a forwarding plane, and particularly solves the problem of traffic black holes caused by the intermediate node through the affected BGP attributes. The technical solution provided in the embodiments of the present disclosure achieves the technical effects of shortening the range of network nodes needing to be upgraded and reducing the network maintenance cost.

In an exemplary embodiment, in a case where the first processing affects the first attribute, the first indication information further includes second indication information, and in a case where the first processing does not affect the first attribute, the first indication information further includes third indication information, wherein the second indication information is different from the third indication information, the second indication information is indication information used for instructing the first node to execute second processing, and the third indication information is indication information used for instructing the first node to perform third processing; wherein the second processing includes that: in a case where the second BGP route carries the second indication information, the first node does not add a first forwarding plane entity to a data packet corresponding to the second BGP route, wherein the first forwarding plane entity is a forwarding plane entity corresponding to the first attribute; and the third processing includes that: in a case where the second BGP route carries the third indication information, the first node adds the first forwarding plane entity to the data packet corresponding to the second BGP route, wherein the first forwarding plane entity is the forwarding plane entity corresponding to the first attribute.

In an exemplary embodiment, the first attribute, the first forwarding plane entity, and the second attribute satisfy one of a third condition, a fourth condition, and a fifth condition, wherein the third condition includes: the first attribute being an Entropy Label Capability Attribute (ELCA), the first forwarding plane entity being an Entropy Label Indicator (ELI) label corresponding to the ELCA, and the second attribute being a Multi-Protocol Label Switching (MPLS) label attribute of the first BGP route; the fourth condition includes: the first attribute being a Flow Label Capability Attribute (FLCA), the first forwarding plane entity being a flow label corresponding to the FLCA, and the second attribute being the MPLS label attribute of the first BGP route; the fifth condition includes: the first attribute being a Control Word Capability Attribute (CWCA), the first forwarding plane entity is a control word corresponding to the CWCA, and the second attribute is the MPLS label attribute of the first BGP route.

In an exemplary embodiment, the first BGP route further carries fourth indication information, and the second node determines, according to the fourth indication information, that the third indication information is fifth indication information, wherein the fifth indication information includes a Partial flag bit with a value of 0.

In an exemplary embodiment, the first BGP route further carries fourth indication information; the second node determines, according to the fourth indication information, that the second indication information includes one of sixth indication information or seventh indication information, or determines, according to the fourth indication information, that the third indication information includes eighth indication information, wherein the sixth indication information includes a No-Partial flag bit with a value of 0, and the fourth indication information is kept unchanged; the seventh indication information includes a New-Partial flag bit with a value of 1, and the fourth indication information is kept unchanged; the eighth indication information includes a Partial flag bit with a value of 0, and the fourth indication information is kept unchanged.

In an exemplary embodiment, before the second node receives the first BGP route advertised by the third node, the third node adds the fourth indication information into the first BGP route.

In an exemplary embodiment, only when all modifications performed on attributes other than the first attribute in the first BGP route do not affect validity of the first attribute, the second node adds the third indication information to the second BGP route when sending the second BGP route to the first node.

In an exemplary embodiment, the fourth indication information is ninth indication information, wherein the ninth indication information is formed by a Transitive flag bit located in the first attribute and having a value of 1 and a Smart-Partial flag bit located in the first attribute and having a value of 1.

In an exemplary embodiment, the fourth indication information is tenth indication information, wherein the tenth indication information is formed by a Transitive flag bit located in the first attribute and having a value of 0 and a New-Transitive flag bit located in the first attribute and having a value of 1.

In an exemplary embodiment, in a case where a first condition is not satisfied, it is determined that the first processing affects the first attribute; or in a case where the first condition is satisfied, it is determined that the first processing does not affect the first attribute, wherein the first condition includes one of the following: the second node does not modify a next hop of the first BGP route; the second node modifies an address of the next-hop of the first BGP route to an IP address of the second node, and the second attribute carried by the second BGP route satisfies a second condition.

In an exemplary embodiment, the second condition includes that the second attribute does not cause the first forwarding plane entity to be exposed on the second node.

In an exemplary embodiment, the second condition includes that the second attribute does not cause a second forwarding plane entity to be stripped off on the second node, wherein the second forwarding plane entity is a forwarding plane entity adjacent to the first forwarding plane entity in an outer layer of the first forwarding plane entity.

In an exemplary embodiment, the second attribute is a first Multi-Protocol Label Switching (MPLS) label of the first BGP route, the first processing is modifying, by the second node, the first MPLS label of the first BGP route to a second MPLS label allocated by the second node, and the method further includes: in a case where a label operation corresponding to the second MPLS label on a forwarding plane is Swap, adding the third indication information before the second node advertises the second BGP route to the first node; in a case where the label operation corresponding to the second MPLS label in the forwarding plane is Pop, adding the second indication information before the second node advertises the second BGP route to the first node.

In an exemplary embodiment, the third indication information includes a Partial flag bit with a value of 0 in the first attribute.

In an exemplary embodiment, the fourth indication information is a New-Transitive flag bit in the first attribute, and the method further includes: setting, by the third node, the value of the No-Partial flag bit to 1 before advertising the first BGP route; in response to a value of the New-Transitive flag bit being 1, determining, by the second node, that the third indication information includes the No-Partial flag bit with the value of 1 in the first attribute and a Transitive flag bit with a value of 0.

In an exemplary embodiment, the fourth indication information is a Smart-Partial flag bit in the first attribute, and the method further includes: in response to a value of the Smart-Partial flag bit being 1, determining that the second indication information includes the Partial flag bit with the value of 1 in the first attribute.

In an exemplary embodiment, the first processing is processing not affecting the first attribute, there is a fourth node between the first node and the third node, the fourth node is a node which is unable to recognize a New-Transitive flag bit, a Smart-Partial flag bit, a New-Partial flag bit, a No-Partial flag bit and the first attribute, the fourth node sends a fifth BGP route to the first node, the second node and the fourth node both modify the second attribute without affecting the first attribute, and the third indication information is different from a value of a corresponding field in the fifth BGP route.

In an exemplary embodiment, the computer-readable storage medium may include, but is not limited to, any medium that can store a computer program, such as a Universal Serial Bus (USB) flash drive, a Read-Only Memory (ROM), a Random Access Memory (RAM), a removable hard disk, a magnetic disk, or an optical disc.

In the present embodiment, the foregoing computer-readable storage medium may be configured to execute the following operations S1 to S3.

At operation S1, a second node receives a first BGP route advertised by a third node, wherein the first BGP route carries a first attribute and a second attribute.

At operation S2, the second node performs first processing on the second attribute to obtain a second BGP route, wherein the second node is located between the third node and a first node, the second node is unable to recognize the first attribute, but has a capability of recognizing the second attribute, and the first processing is modifying the second attribute by the second node.

At operation S3, in response to the second node being unable to recognize the first attribute, the second node adds first indication information to the second BGP route while retaining the first attribute in the second BGP route, and sends the second BGP route to the first node, wherein the first indication information is indication information used for indicating whether the first processing affects the first attribute.

For exemplary embodiments in the present embodiment, reference may be made to the embodiments described in the foregoing embodiments and exemplary embodiments, and details are not repeatedly described in the present embodiment.

The embodiments of the present disclosure further provide an electronic device, including a memory and a processor. The memory stores a computer program. The processor is configured to run the computer program to execute operations in any one of the method embodiments.

In the present embodiment, the processor may be configured to execute the following operations S1 to S3 when running a computer program.

At operation S1, a second node receives a first BGP route advertised by a third node, wherein the first BGP route carries a first attribute and a second attribute.

At operation S2, the second node performs first processing on the second attribute to obtain a second BGP route, wherein the second node is located between the third node and a first node, the second node is unable to recognize the first attribute, but has a capability of recognizing the second attribute, and the first processing is modifying the second attribute by the second node.

At operation S3, in response to the second node being unable to recognize the first attribute, the second node adds first indication information to the second BGP route while retaining the first attribute in the second BGP route, and sends the second BGP route to the first node, wherein the first indication information is indication information used for indicating whether the first processing affects the first attribute.

In an exemplary embodiment, the electronic device may further include a transmission apparatus and an input/output apparatus, wherein the transmission apparatus is connected to the processor, and the input/output apparatus is connected to the processor.

For exemplary embodiments in the present embodiment, reference may be made to the embodiments described in the foregoing embodiments and exemplary embodiments, and details are not repeatedly described in the present embodiment.

Obviously, those having ordinary skill in the art should understand that each module or each operation of the present disclosure can be implemented by a general purpose computing device, they may be centralized on a single computing device or distributed on a network composed of a plurality of computing devices, they can be implemented by program codes executable by a computing device, and thus can be stored in a storage apparatus and executed by the computing device. Furthermore, in some cases, the shown or described operations may be executed in an order different from that described here, or they are made into integrated circuit modules respectively, or a plurality of modules or operations therein are made into a single integrated circuit module for implementation. As such, the present disclosure is not limited to any particular hardware and software combination.

The foregoing descriptions are merely exemplary embodiments of the present disclosure, but are not intended to limit the present disclosure. For those having ordinary skill in the art, the present disclosure may have various modifications and variations. Any modifications, equivalent replacements, improvements and the like made within the principle of the present disclosure shall belong to the scope of protection of the present disclosure.

The invention claimed is:

1. A Border Gateway Protocol (BGP) route sending method, comprising:

receiving, by a second node, a first BGP route advertised by a third node, wherein the first BGP route carries a first attribute and a second attribute;

performing, by the second node, first processing on the second attribute to obtain a second BGP route, wherein the second node is located between the third node and a first node, the second node is unable to recognize the first attribute, but has a capability of recognizing the second attribute, and the first processing is modifying the second attribute by the second node; and in response to the second node being unable to recognize the first attribute, adding, by the second node, first indication information to the second BGP route while retaining the first attribute in the second BGP route, and sending, by the second node, the second BGP route to the first node, wherein the first indication information is indication information used for indicating whether the first processing affects the first attribute.

2. The BGP route sending method according to claim 1, wherein in a case where the first processing affects the first attribute, the first indication information further comprises second indication information, and in a case where the first processing does not affect the first attribute, the first indication information further comprises third indication information, wherein the second indication information is different from the third indication information, the second indication information is indication information used for instructing the first node to execute second processing, and the third indication information is indication information used for instructing the first node to perform third processing;

wherein the second processing comprises that:

in a case where the second BGP route carries the second indication information, the first node does not add a first forwarding plane entity to a data packet corresponding to the second BGP route, wherein the first forwarding plane entity is a forwarding plane entity corresponding to the first attribute; and the third processing comprises that:

in a case where the second BGP route carries the third indication information, the first node adds the first forwarding plane entity to the data packet corresponding to the second BGP route, wherein the first forwarding plane entity is the forwarding plane entity corresponding to the first attribute.

3. The BGP route sending method according to claim 2, wherein the first attribute, the first forwarding plane entity, and the second attribute satisfy one of a third condition, a fourth condition, and a fifth condition, wherein the third condition comprises: the first attribute being an Entropy Label Capability Attribute (ELCA), the first forwarding plane entity being an Entropy Label Indicator (ELI) label corresponding to the ELCA, and the second attribute being a Multi-Protocol Label Switching (MPLS) label attribute of the first BGP route;

the fourth condition comprises: the first attribute being a Flow Label Capability Attribute (FLCA), the first forwarding plane entity being a flow label corresponding to the FLCA, and the second attribute being the MPLS label attribute of the first BGP route;

the fifth condition comprises: the first attribute being a Control Word Capability Attribute (CWCA), the first forwarding plane entity is a control word corresponding to the CWCA, and the second attribute is the MPLS label attribute of the first BGP route.

4. The BGP route sending method according to claim 2, wherein the first BGP route further carries fourth indication information, and the second node determines, according to the fourth indication information, that the third indication information is fifth indication information, wherein the fifth indication information comprises a Partial flag bit with a value of 0;

or, the first BGP route further carries fourth indication information; the second node determines, according to the fourth indication information, that the second indication information comprises one of sixth indication information or seventh indication information, or determines, according to the fourth indication information, that the third indication information comprises eighth indication information, wherein the sixth indication information comprises a No-Partial flag bit with a value of 0, and the fourth indication information is kept unchanged; the seventh indication information comprises a New-Partial flag bit with a value of 1, and the fourth indication information is kept unchanged: the eighth indication information comprises a Partial flag bit with a value of 0, and the fourth indication information is kept unchanged.

5. The BGP route sending method according to claim 4, wherein before receiving, by the second node, the first BGP route advertised by the third node, the method further comprises:

adding, by the third node, the fourth indication information into the first BGP route.

6. The BGP route sending method according to claim 4, wherein only when all modifications performed on attributes other than the first attribute in the first BGP route do not affect validity of the first attribute, the second node adds the third indication information to the second BGP route when sending the second BGP route to the first node.

7. The BGP route sending method according to claim 4, wherein the fourth indication information is ninth indication information, wherein the ninth indication information is formed by a Transitive flag bit located in the first attribute and having a value of 1 and a Smart-Partial flag bit located in the first attribute and having a value of 1.

8. The BGP route sending method according to claim 4, wherein the fourth indication information is tenth indication information, wherein the tenth indication information is formed by a Transitive flag bit located in the first attribute and having a value of 0 and a New-Transitive flag bit located in the first attribute and having a value of 1.

9. The BGP route sending method according to claim 1, wherein in a case where a first condition is not satisfied, it is determined that the first processing affects the first attribute; or in a case where the first condition is satisfied, it is determined that the first processing does not affect the first attribute, wherein the first condition comprises one of the following:

the second node does not modify a next hop of the first BGP route;

the second node modifies an address of the next-hop of the first BGP route to an IP address of the second node, and the second attribute carried by the second BGP route satisfies a second condition.

10. The BGP route sending method according to claim 2, wherein the second condition comprises that the second attribute does not cause the first forwarding plane entity to be exposed on the second node.

11. The BGP route sending method according to claim 2, wherein the second condition comprises that the second attribute does not cause a second forwarding plane entity to be stripped off on the second node, wherein the second forwarding plane entity is a forwarding plane entity adjacent to the first forwarding plane entity in an outer layer of the first forwarding plane entity.

12. The BGP route sending method according to claim 2, wherein the second attribute is a first Multi-Protocol Label Switching (MPLS) label of the first BGP route, the first processing is modifying, by the second node, the first MPLS label of the first BGP route to a second MPLS label allocated by the second node, and the method further comprises:

in a case where a label operation corresponding to the second MPLS label on a forwarding plane is Swap, adding the third indication information before the second node advertises the second BGP route to the first node;

in a case where the label operation corresponding to the second MPLS label in the forwarding plane is Pop, adding the second indication information before the second node advertises the second BGP route to the first node.

13. The BGP route sending method according to claim 12, wherein the third indication information comprises a Partial flag bit with a value of 0 in the first attribute.

14. The BGP route sending method according to claim 4, wherein the fourth indication information is a New-Transitive flag bit in the first attribute, and the method further comprises:

setting, by the third node, the value of the No-Partial flag bit to 1 before advertising the first BGP route;

in response to a value of the New-Transitive flag bit being 1, determining, by the second node, that the third indication information comprises the No-Partial flag bit with the value of 1 in the first attribute and a Transitive flag bit with a value of 0;

or, the fourth indication information is a Smart-Partial flag bit in the first attribute, and the method further comprises: in response to a value of the Smart-Partial flag bit being 1, determining that the second indication information comprises the Partial flag bit with the value of 1 in the first attribute.

15. The BGP route sending method according to claim 4, wherein the first processing is processing not affecting the first attribute, there is a fourth node between the first node and the third node, the fourth node is a node which is unable to recognize a New-Transitive flag bit, a Smart-Partial flag bit, a New-Partial flag bit, a No-Partial flag bit and the first attribute, the fourth node sends a fifth BGP route to the first node, the second node and the fourth node both modify the second attribute without affecting the first attribute, and the third indication information is different from a value of a corresponding field in the fifth BGP route.

16. A non-transitory computer-readable storage medium, wherein the computer-readable storage medium stores a computer program, and the computer program, when running on a processor, causes the processor to execute the following operations:

receiving, by a second node, a first BGP route advertised by a third node, wherein the first BGP route carries a first attribute and a second attribute;

performing, by the second node, first processing on the second attribute to obtain a second BGP route, wherein the second node is located between the third node and a first node, the second node is unable to recognize the first attribute, but has a capability of recognizing the second attribute, and the first processing is modifying the second attribute by the second node; and in response to the second node being unable to recognize the first attribute, adding, by the second node, first indication information to the second BGP route while retaining the first attribute in the second BGP route, and sending, by the second node, the second BGP route to the first node, wherein the first indication information is indication information used for indicating whether the first processing affects the first attribute.

17. An electronic device, comprising a memory and a processor, wherein the memory stores a computer program, and the processor is configured to run the computer program to execute the following operations:

receiving, by a second node, a first BGP route advertised by a third node, wherein the first BGP route carries a first attribute and a second attribute;

performing, by the second node, first processing on the second attribute to obtain a second BGP route, wherein the second node is located between the third node and a first node, the second node is unable to recognize the first attribute, but has a capability of recognizing the second attribute, and the first processing is modifying the second attribute by the second node; and in response to the second node being unable to recognize the first attribute, adding, by the second node, first indication information to the second BGP route while retaining the first attribute in the second BGP route, and sending, by the second node, the second BGP route to the first node, wherein the first indication information is indication information used for indicating whether the first processing affects the first attribute.

18. The BGP route sending method according to claim 9, wherein the second condition comprises that the second attribute does not cause the first forwarding plane entity to be exposed on the second node.

19. The BGP route sending method according to claim 9, wherein the second condition comprises that the second attribute does not cause a second forwarding plane entity to be stripped off on the second node, wherein the second forwarding plane entity is a forwarding plane entity adjacent to the first forwarding plane entity in an outer layer of the first forwarding plane entity.

20. The BGP route sending method according to claim 12, wherein the fourth indication information is a New-Transitive flag bit in the first attribute, and the method further comprises: setting, by the third node, the value of the No-Partial flag bit to 1 before advertising the first BGP route; in response to a value of the New-Transitive flag bit being 1, determining, by the second node, that the third indication information comprises the No-Partial flag bit with the value of 1 in the first attribute and a Transitive flag bit with a value of 0;

or, the fourth indication information is a Smart-Partial flag bit in the first attribute, and the method further comprises: in response to a value of the Smart-Partial flag bit being 1, determining that the second indication information comprises the Partial flag bit with the value of 1 in the first attribute.

* * * * *